US 9,405,670 B2

(12) United States Patent
Pan et al.

(10) Patent No.: US 9,405,670 B2
(45) Date of Patent: Aug. 2, 2016

(54) WEAR LEVELING METHOD AND APPARATUS

(75) Inventors: Liyang Pan, Beijing (CN); Chen Tang, Beijing (CN)

(73) Assignee: Tsinghua University, Beijing (CN)

( * ) Notice: Subject to any disclaimer, the term of this patent is extended or adjusted under 35 U.S.C. 154(b) by 898 days.

(21) Appl. No.: 13/519,230

(22) PCT Filed: Mar. 15, 2012

(86) PCT No.: PCT/CN2012/072372
§ 371 (c)(1),
(2), (4) Date: Jun. 26, 2012

(87) PCT Pub. No.: WO2012/167642
PCT Pub. Date: Dec. 13, 2012

(65) Prior Publication Data
US 2012/0317345 A1 Dec. 13, 2012

(30) Foreign Application Priority Data

Jun. 9, 2011 (CN) .......................... 2011 1 0154330
Nov. 2, 2011 (CN) .......................... 2011 1 0341392

(51) Int. Cl.
*G06F 13/00* (2006.01)
*G06F 12/02* (2006.01)

(52) U.S. Cl.
CPC .... *G06F 12/0246* (2013.01); *G06F 2212/7211* (2013.01)

(58) Field of Classification Search
CPC .................................. G06F 12/00; G06F 12/02
See application file for complete search history.

(56) References Cited

U.S. PATENT DOCUMENTS

| 7,096,313 | B1 * | 8/2006 | Chang et al. ................. 711/103 |
| 2008/0183950 | A1 | 7/2008 | Roohparvar | |
| 2008/0235306 | A1 * | 9/2008 | Kim et al. ..................... 707/206 |

(Continued)

FOREIGN PATENT DOCUMENTS

| CN | 101595528 A | 12/2009 |
| CN | 101740110 A | 6/2010 |

(Continued)

OTHER PUBLICATIONS

"A Tri-pool Dynamic Wear-Leveling Algorithm for Large Scale Flash Memory Storage Systems", Surafel Teshome, Apr. 26-29, 2011, IEEE,978-1-4244-9222-0.*

(Continued)

*Primary Examiner* — Charles Rones
*Assistant Examiner* — Han Doan
(74) *Attorney, Agent, or Firm* — Harness, Dickey & Pierce, P.L.C.

(57) ABSTRACT

The present invention discloses a wear leveling method; the method determines a pool mask for each physical block based on an erase number of each physical block. For different erase numbers, masks of the physical blocks are determined as cool pool mask CPM, normal pool mask NPM or hot pool mask HPM. When the pool mask of one physical block is changed from NPM to HPM, data of any physical block of which the pool mask is CPM is copied to the physical block of which the pool mask is HPM, and the physical block of which the pool mask is CPM is recycled as a garbage block. The present invention discloses a wear leveling apparatus, the method and apparatus can reduce additional wear caused by the wear leveling.

32 Claims, 5 Drawing Sheets

(56) References Cited

U.S. PATENT DOCUMENTS

| | | | |
|---|---|---|---|
| 2011/0055458 A1* | 3/2011 | Kuehne | 711/103 |
| 2011/0191521 A1* | 8/2011 | Araki et al. | 711/103 |
| 2011/0238890 A1* | 9/2011 | Sukegawa | 711/103 |
| 2012/0023144 A1* | 1/2012 | Rub | 707/813 |
| 2012/0254513 A1* | 10/2012 | Uehara et al. | 711/103 |

FOREIGN PATENT DOCUMENTS

| | | |
|---|---|---|
| CN | 102081576 A | 6/2011 |
| CN | 102222046 A | 10/2011 |
| WO | 2006108756 A1 | 10/2006 |
| WO | 2011072538 A1 | 6/2011 |
| WO | 2012167642 A1 | 12/2012 |

OTHER PUBLICATIONS

Chinese Office Action for Application No. 201110154330.2 dated Oct. 23, 2012, and its English translation thereof.
Chinese Office Action for Application No. 201110154330.2 dated Apr. 16, 2013, and its English translation thereof.
Kawaguchi, Atsuo, Shingo Nishioka, and Hiroshi Motoda. "A Flash-Memory Based File System." Advanced Research Laboratory, Hitachi, Ltd.
Chinese Office Action for Application No. 201110341392.4 dated Jan. 6, 2014, and its English translation thereof.
Chinese Office Action for Application No. 201110341392.4 dated Aug. 29, 2014, and its English translation thereof.
Chinese Office Action for Application No. 201110341392.4 dated Feb. 25, 2015, and its English translation thereof.

* cited by examiner

WEAR LEVELING METHOD AND APPARATUS

FIELD OF THE INVENTION

The present invention relates generally to storage technology, and more particularly, to a wear leveling method and apparatus.

BACKGROUND ART

At present, non-volatile memory has been widely used in computers, communications and consumer electronics products. For example, U disk, MP3, digital cameras, mobile communications terminal, solid-state hard disk and other products use the non-volatile memory as the storage medium. As these products continue to increase storage capacity requirements and process geometries of the non-volatile memory continue to shrink, the reliability of non-volatile memory is facing more and more severe challenges. Especially, the erase number of the minimum unit physical block of erase operation of the nonvolatile memory is limited; this will cause serious influence on the service life of the nonvolatile memory. For the problem that the erase number of the physical block is limited, the existing technology requires wear leveling operations to be performed on the physical block. Via controlling the erase operations of the physical block, it tries to distribute erase operations evenly over all physical blocks of the memory to avoid that some physical blocks experience higher numbers of erase operation and reach the upper limit of the erase number sooner than other physical blocks and fail, which causes the memory as a whole failed in the condition that most physical blocks are still far from their end of life.

The wear leveling includes two kinds, i.e., dynamic wear leveling which dynamically balances the erase numbers of all physical block by controlling the written physical blocks in data writing process, and static wear leveling which statically balances the erase numbers of all physical block by adjusting the distribution of the cold and hot data (the data which is frequently erased is called hot data, and the data which is not frequently erased is called cold data) stored in the physical blocks. For these two kinds of wear leveling, the existing technology has brought forward many algorithms, but these algorithms have not well solved the contradiction between wear leveling effect and reduction of the additional wear caused by the wear leveling algorithms themselves. Further, the implementation of the existing wear leveling algorithms is based on saving wear information of each physical block; with the increased memory capacity, the number of the physical blocks in the memory which the wear leveling is required to be performed on is greatly increased. When the wear leveling algorithm is implemented, the speed of searching for wear information of the physical blocks also becomes slower and slower.

A widely used representative wear leveling algorithm "Dual-Pool algorithm" will be taken as an example in the following to elaborate on the existing technology.

As shown in FIG. 1, this algorithm is an integrated algorithm which combines dynamic wear leveling and static wear leveling. This algorithm sets cool pool and hot pool properties for physical blocks, and defines EC as a total erase number of the physical block, EEC as a restarted cumulative erase number (hereinafter referred to as the effective erase number) of the physical block after changes of hot and cool pool properties of the physical blocks, PT as marks of the hot and cool pools properties of the physical block, in which CP represents cool pool, and HP represents hot pool. Wear information for each physical block needed to be recorded includes EC, EEC and PT.

In this algorithm, $Q_{CP}^{EC}$, $Q_{HP}^{EC}$, $Q_{CP}^{EEC}$, $Q_{HP}^{EEC}$ are respectively defined as a queue of the erase numbers of the cool pool, a queue of the erase numbers of the hot pool, a queue of the effective erase numbers of the cool pool, and a queue of the effective erase numbers of the hot pool. $H^+(Q)$ and $H^-(Q)$ are respectively defined as functions of the maximum and minimum values (specific physical block) returned to the queue Q. EC(B) is a function of the total erase number returned to the physical block B. EEC(B) is a function of the effective erase number returned to the physical block B.

The specific implementation process of this algorithm is shown in FIG. 1 and includes the following steps:

Step 101: obtaining wear information; before implementing the Dual-Pool algorithm, it is needed to first obtain wear information of all the physical blocks and then manage the physical blocks. The step of obtaining wear information is usually completed in the power-up initialization process of the memory which can be divided into two situations: if the memory is non-first used, the wear information can be recorded in the memory (such as backup area which is specifically carved out of the memory, invisible to the user and used to store management information) when the memory was normally uninstalled, during the power-up initialization process of the memory, it is only needed to read the data of the backup area of the memory to obtain the wear information; if the memory is first used, no data is in the backup area, at this moment, it is needed to build wear information, i.e., setting EC and EEC to be 0, marking cold and hot pool properties for the physical blocks, and dividing the physical blocks into cool pool or hot pool; the specific method for dividing the physical blocks into cool pool or hot pool can be arbitrary, such as random division.

Step 102: determining whether there is a written request, if yes, proceeding to step 103, otherwise proceeding to step 117;

Step 103: determining whether written block allocated to write the request has been filled, if yes, proceeding to step 104, otherwise proceeding to step 105;

Step 104: allocating blank block to write the request from the pre-set blank block queue according to the new allocation to the new (FIFO) approach (according to orders of entering into the blank block queue, the blank block first entering into the queue will be first allocated), proceeding into step 105;

Step 105: responding to the written request and writing data to the allocated written block;

Step 106: determining whether the difference between $EC(H^{+(Q_{HP}^{EC})})$ and $EC(H^-(Q_{CP}^{EC}))$ exceeds the set threshold TH, if yes, proceeding to step 107, otherwise, proceeding to step 111;

Step 107: compulsively recycling the $H^+(Q_{HP}^{EC})$ physical block, i.e., copying valid data stored in this physical block to other physical block and erasing the data stored in the $H^+(Q_{HP}^{EC})$ physical block;

Step 108: copying data of the $H^-(Q_{CP}^{EC})$ physical block to the $H^+(Q_{HP}^{EC})$ physical block;

Step 109: erasing the data of the $H^-(Q_{CP}^{EC})$ physical block so that the $H^-(Q_{CP}^{EC})$ physical block becomes a blank block;

Step 110: exchanging the cool and hot cool properties of the $H^-(Q_{CP}^{EC})$ and $H^+(Q_{CP}^{EC})$ due to the changes of the cool and hot cool properties, EEC of each of the $H^-(Q_{CP}^{EC})$ and $H^+(Q_{HP}^{EC})$ physical blocks will be cleared and restart to accumulate;

Step 111: determining whether the difference between EC($H^{+(Q_{HP}^{EC})}$) and EC($H^-(Q_{CP}^{EC})$) exceeds two times of the threshold TH, if yes, proceeding to step 112, otherwise, proceeding to step 113;

Step 112: adjusting PT of the $H^-(Q_{HP}^{EC})$ physical block from hot pool to cool pool;

Step 113: determining whether the difference between EEC($H^+(Q_{CP}^{EEC})$) and EEC($H^-(Q_{HP}^{EEC})$) exceeds the threshold TH, if yes, proceeding to step 114, otherwise, proceeding to step 115;

Step 114: adjusting PT of the $H^+Q_{CP}^{EEC}$ physical block from cool pool to hot pool;

Step 115: determining whether available space of the memory is less than pre-set threshold, if yes, proceeding to step 116, otherwise returning back to step 102;

Step 116: recycling garbage, returning back to step 102;

Step 117: determining whether the memory is uninstalled, if yes, proceeding to step 118, otherwise returning back to step 102;

Step 118: saving the wear information, and ending the process.

In the above steps, steps 102~103, 105 are the normal process of writing data, step 104 is the dynamic wear leveling part of this algorithm, i.e., controlling the allocation of the blank blocks through the blank block queue adopting the FIFO mode to achieve the effect of dynamic wear-leveling.

Steps 106~114 are static wear leveling part of this algorithm, which moves the cool and hot data stored in the $H^+(Q_{HP}^{EC})$ and $H^-(Q_{CP}^{EC})$, and exchanges the cool and hot properties of the $H^+(Q_{HP}^{EC})$ and the $H^-(Q_{CP}^{EC})$, so that physical blocks of high erase numbers store the cool data and enter into the cool pool to slow wear, physical blocks of small erase numbers store the hot data and enter into the hot pool to accelerate wear, thereby achieving the purpose of wear leveling.

Step 115 is followed by the process of recycling garbage and uninstalling of the memory; the recycling garbage includes the process of data transferring and erasing. The so-called data transferring means that data marked as valid must be copied to other blocks before being erased; the so-called erasing process means a process that the physical block to which date have been written and of which all data has been marked as invalid, i.e., garbage block, is erased to obtain a blank block. The existing garbage recycling process generally randomly selects garbage block, and the dynamic leveling part of the Dual-Pool algorithm does not improve the process of recycling garbage. Further, in the uninstall process, the memory can store the wear information (such as EC, EEC, PT and blank block queue), which is needed by the Dual-Pool algorithm to prepare for use in the next booing of the memory.

Obviously, in order to statically level the erase numbers of all the physical blocks, the Dual-Pool algorithm needs to move the valid data of the two physical blocks $H^+(Q_{HP}^{EC})$ and $H^-(Q_{CP}^{EC})$, and erase the two physical blocks $H^+(Q_{HP}^{EC})$ and $H^-(Q_{CP}^{EC})$. This will have a greater system overhead and additionally increase the erase numbers of the physical blocks, i.e., additional wear; this is a counter-effect for the purpose of wear leveling, i.e. this is a counter-effect for the purpose of increasing the lifetime of the memory.

Further, since the Dual-Pool algorithm needs to calculate EC($H^+(Q_{HP}^{EC})$) and EC($H^-(Q_{CP}^{EC})$), this requires traversing all the physical blocks of the entire memory before running further. However, as storage capacity continues to increase, the number of the physical blocks is also increasing, the speed of searching for the physical blocks also becomes slower and slower.

SUMMARY

One embodiment of the present invention provided a wear leveling method and apparatus, which can reduced additional wear caused by wear leveling.

In order to achieve the above mentioned purpose, the technical solution of the present invention is specifically implemented as follows:

A wear leveling method, the method includes:

determining a pool mask for each physical block based on the erase number of each physical block;

wherein for different erase numbers, masks of the physical blocks are determined as cool pool mask CPM, normal pool mask NPM or hot pool mask HPM;

when the pool mask of a physical block is changed from NPM to HPM, data of any physical block of which the pool mask is CPM is copied to the physical block of which the pool mask is HPM, and the physical block of which the pool mask is CPM is recycled as a garbage block.

Preferably, the step of that for different erase numbers, masks of the physical blocks are determined as cool pool mask CPM, normal pool mask NPM or hot pool mask HPM, comprises:

if a physical block which has an erase number equal to value of reference erase number counter (RECC), wherein the value of the RECC is equal to an erase number of the block which has the smallest erase number among all the blocks, the pool mask of this physical block is determined as CPM; if one physical block which has an erase number greater than or equal to value of RECC plus TH, a pool mask of this physical block is determined as HPM; if one physical block of which an erase number is other value, a pool mask of this physical block is determined as NPM;

wherein the TH is a pre-set threshold and is an integer greater than 1.

Preferably, the TH changes with wear conditions of the physical blocks.

Preferably, the step of that the TH changes with wear conditions of the physical blocks, comprises:

the TH reduces with increasing of the RECC.

Preferably, the step of that the TH reduces with increasing of the RECC, comprises:

when the RECC is changed, a pre-set variable is subtracted from the TH until the TH reaches a pre-set minimum value.

Preferably, the step of that the TH changes with wear conditions of the physical blocks, comprises:

the TH reduces with increasing of an average erase number of all the physical blocks.

Preferably, the step of that the TH reduces with increasing of an average erase number of all the physical blocks, comprises:

when the average erase number of all the physical blocks is increased with a pre-set added value, a pre-set variable is subtracted from the TH until the TH reaches a pre-set minimum value.

Preferably, the method further comprises:

establishing a blank block chained list EBL which is used to manage blank blocks, the blank blocks in the EBL being arranged according to an ascending order of erase numbers thereof;

when it is needed to allocate a blank block to a written request, the first blank block in the EBL is allocated as a write block to the written request.

Preferably, the EBL prevents one blank block of which a pool mask is HPM from entering.

Preferably, the method further comprises:

establishing a garbage block chained list GBL which is used to manage garbage blocks, and the garbage blocks in the GBL being arranged according to an ascending order of erase numbers thereof.

Preferably, the GBL prevents one garbage block of which a pool mask is HPM from entering.

Preferably, when the number of the blank blocks in the EBL is less than a pre-set threshold, a garbage recycling process described in the following is performed:

if the GBL is non-empty, data of the first garbage block in the GBL is erased so that the first garbage block in the GBL becomes a blank block which is then inserted in the EBL;

if the GBL is empty, valid data of one physical block which has the most garbage data and smallest erase number among all physical blocks of which pool masks are CPM and NPM, is written to the currently allocated write block, and the physical block which has the most garbage data and smallest erase number is inserted in the GBL, and data of the first garbage block in the GBL is erased so that the first garbage block in the GBL becomes a blank block and is then inserted in the EBL.

Preferably, wherein when the garbage recycling comprises:

garbage blocks of which masks are CPM and NPM are inserted in the GBL.

Preferably, if the memory is first used, before performing the step of determining a pool mask for each physical block based on an erase number of each physical block, current erase numbers of all the physical blocks are set to be 0, and current pool masks of all the physical blocks are set to be CPM.

Preferably, if the memory is non-first used and the memory was normally uninstalled, before performing the step of determining a pool mask for each physical block based on an erase number of each physical block, current erase numbers, pool masks, EBL and GBL of all the physical blocks are read and obtained from a backup area of the memory.

Preferably, if the memory is not first used and was not normally uninstalled, before performing the step of determining a pool mask for each physical block based on an erase number of each physical block, the method further includes the following:

erase numbers, pool masks, EBL and GBL of all the physical blocks which are backed up during a normal uninstall process of the memory are loaded from the backup area of the memory;

storage conditions of the physical blocks in the EBL are inspected one by one starting from the first physical block in the EBL; if one physical block is not a blank block, then this physical block is deleted from the EBL; the inspection continues until detecting that one physical block is blank block or until the EBL is empty;

storage conditions of the physical blocks in the GBL are inspected one by one starting from the first physical block in the GBL; if one physical block is a blank block, then this physical block is deleted from the GBL and is inserted in the EBL; the inspection continues until detecting that one physical block is a garbage block or until the GBL is empty.

Preferably, if pool masks of all the physical blocks are not CPM, the value of RECC is corrected according to an erase number of one physical block having the smallest erase number among all the current physical blocks, and pool masks of all the physical blocks are redefined according to the corrected RECC.

Preferably, the method further comprises: when the memory is normally uninstalled, current erase numbers, masks, current EBL and GBL of all the physical blocks are saved to the backup area of the memory.

Preferably, the erase number of each physical block is saved in real time in a physical page of the physical block.

A wear leveling apparatus, the apparatus comprising:

a pool maintenance module used to determine a pool mask for each physical block based on an erase number of each physical block; wherein for different erase numbers, masks of the physical blocks are cool pool mask CPM, normal pool mask NPM or hot pool mask HPM;

a static leveling module connected to the pool maintenance module; when a pool mask of one physical block is changed from NPM to HPM, the static leveling module is used to copy data of any one physical block of which a pool mask is CPM to the physical block of which the pool mask is HPM;

a garbage recycling module connected to the static leveling module and used to recycle the physical block of which the pool mask is CPM as a garbage block.

Preferably, the pool maintenance module comprises:

a determining unit used to determine a pool mask of a physical block as CPM when an erase number of the physical block is equal to value of RECC; the determining unit used to determine a pool mask of a physical block as hot pool mask when an erase number of the physical block is greater than or equal to value of RECC plus TH; the determining unit used to determine a pool mask of a physical block as normal pool mask when an erase number of the physical block is other value;

wherein the RECC is a reference erase number counter, and the value of the RECC is equal to an erase number of one block which has the smallest erase number among all the blocks; the TH is a pre-set threshold and is an integer greater than 1.

Preferably, the apparatus further comprises: a variable threshold module connected to the pool maintenance module and used to make the TH change with wear conditions of the physical blocks Preferably, the variable threshold module comprises:

a reference value obtaining unit used to obtain the value of the RECC;

a threshold value determining unit connected to the reference value obtaining unit and used to make the TH reduce with increasing of the RECC.

Preferably, the threshold value determining unit is specifically used to:

when the RECC is changed, the threshold value determining unit subtracts a pre-set variable from the value of the TH until the TH reaches a pre-set minimum value.

Preferably, the variable threshold module comprises:

an average erase number calculating unit used to calculate an average erase number of all the physical blocks;

a threshold value determining unit connected to the average erase number calculating unit and used to make the TH reduce with increasing of the average erase number of all the physical blocks.

Preferably, the threshold value determining unit is specifically used to:

when the average erase number of all the physical blocks is increased with a pre-set added value, the threshold value determining unit subtracts a pre-set variable from the value of the TH until the TH reaches a pre-set minimum value.

Preferably, the apparatus further comprises:

an EBL module to maintain a blank block chained list EBL which is used to manage the blank blocks, the blank blocks in EBL being arranged according to an ascending order of erase numbers thereof; when it is needed to allocate a blank block to a written request, the EBL module allocates the first blank block in the EBL as a write block to the written request.

Preferably, the EBL module prevents one blank block of which a pool mask is HPM from entering.

Preferably, the apparatus further comprises:

a GBL module which is connected to the garbage recycling module and the EBL module, respectively; the GBL module used to maintain a garbage block chained list GBL which is used to manage the garbage blocks, the garbage blocks in the GBL being arranged according to an ascending order of erase numbers thereof.

Preferably, the GBL module prevents one garbage block of which a pool mask is HPM from entering.

Preferably, when available space of the memory is less than a pre-set threshold, the GBL module is further used to:

if the GBL is non-empty, data of the first garbage block in the GBL is erased so that the first garbage block in the GBL becomes a blank block which is then inserted in the EBL;

if the GBL is empty, valid data of one physical block which has the most garbage data and smallest erase number among all physical blocks of which pool masks are CPM and NPM, is first written to the currently allocated write block, and the physical block which has the most garbage data and smallest erase number is inserted in the GBL, and then data of the first garbage block in the GBL is erased so that the first garbage block in the GBL becomes a blank block and is then inserted in the EBL.

Preferably, the garbage recycling module is specifically used to insert garbage blocks of which masks are CPM and NPM in the GBL maintained by the GBL module.

Preferably, the pool maintenance module further comprises:

a current value determining unit connected to the determining unit; the current value determining unit used to set current erase numbers of all the physical blocks to be 0 and current pool masks of all the physical blocks to be cool pool mask when the memory is first used.

Preferably, the pool maintenance module further comprises:

a current value determining unit connected to the determining unit; the current value determining unit used to read and obtain current erase numbers, pool masks, EBL and GBL of all the physical blocks from the backup area of the memory when the memory is non-first used and the memory was normally uninstalled.

Preferably, the pool maintenance module further comprises:

a current value determining unit connected to the determining unit; the current value determining unit used to load current erase numbers, pool masks, EBL and GBL of all the physical blocks which are backed up during a normal uninstall process of the memory from the backup area of the memory, when the memory is not first used and was not normally uninstalled;

the EBL module inspects storage conditions of the physical blocks in the EBL one by one starting from the first physical block in the EBL; if one physical block is not blank block, then this physical block is deleted from the EBL; the inspection continues until detecting that one physical block is blank block or until the EBL is empty;

the GBL module inspects storage conditions of the physical blocks in the GBL one by one starting from the first physical block in the GBL; if one physical block is a blank block, then this physical block is deleted from the GBL and is inserted the EBL maintained by the EBL module; the inspection continues until detecting that one physical block is garbage block or until the GBL is empty.

Preferably, the pool maintenance module further comprises:

a rebuilding unit connected to the determining unit; when pool masks of all the physical blocks are not CPM, the value of RECC is corrected according to the erase number of the block having the smallest erase number among all the current blocks, then pool masks of all the physical blocks are redefined according to the corrected RECC.

Preferably, the apparatus further comprises:

a backup module which is connected to the pool maintenance module, the EBL module, the GBL module, respectively; the backup module used to save current erase numbers, masks, current EBL and GBL of all the physical blocks to the backup area of the memory when the memory is normally uninstalled.

Preferably, the backup module is further used to save in real time the erase number of each physical block in a physical page of the physical block.

It can be seen from the above mentioned technical solutions, the wear leveling method and apparatus of the present invention divides the physical blocks into three pools and makes improvements to the existing static leveling part, so that the wear leveling method of the invention produces one additional wear only when recycling the physical blocks having cool pool masks, the additional wear is reduced when compared to the existing technology. Further, through making TH which is used to divide the three pools variable with the wear conditions of the physical blocks, thus, better wear leveling effect can be obtained. Moreover, the present invention uses EBL, GBL chained list to control the garbage recycling, write block allocation, and so on, dynamic part of the wear leveling achieves better wear leveling effect than the existing technology. The present invention further prevents physical blocks which have hot pool mask from entering into EBL and GBL, so that the physical blocks which wear more do not continue to wear, this can obtain not only better wear leveling effect but also faster physical block search speed, so that the overall performing efficiency and speed of the present invention is improved compared to the existing technology.

DETAILED DESCRIPTION OF EXAMPLES

In order to make objects, technical solutions and advantages of the present invention clear, the present invention is hereinafter further explained in details with reference to embodiments and drawings.

The present invention determines a pool mask for each physical block mainly based on the erase number of each physical block. For different erase numbers, the masks of the physical blocks can be divided into cool pool mask CPM, normal pool mask NPM or hot pool mask HPM (for the convenience of description, hereinafter, the physical block with the cool pool mask can be called as cool pool block, the physical block with the normal pool mask can be called as normal pool block, the physical block with the hot pool mask can be called as hot pool block). In the static wear leveling, when a pool mask of a physical block of which a pool mask is NPM is changes to the HPM, data of one physical block of which a pool mask is CPM is copied to the physical block of which the pool mask has been changed to HPM, and the physical block of which the pool mask is CPM is recycled as a garbage block. Since the present invention has made improvement to the static leveling part of the existing wear leveling, only one additional wear is produced, i.e., one erase operation will be produced when the physical block of which the pool mask is CPM is recycled as a garbage block, thus, the additional wear is reduced when compared to the existing technology.

Further, via making the threshold of the divided three pools (cool, hot and normal) variable with the wear conditions of the physical blocks, can make the threshold better adapted to the memory's requirement for balanced degree and additional wear under different wear conditions, thereby achieving better wear leveling effect.

Moreover, the present invention can further improve the dynamic part of the existing wear leveling. Garbage recycling process and write block allocation process can be controlled according to erase numbers of the physical blocks, and the hot pool blocks are not involved in the write block allocation process and the garbage block recycling process, so that when the wear leveling method of the present invention is implemented, scope of the physical blocks needed to be searched is smaller and the search speed is faster.

Figure 5:
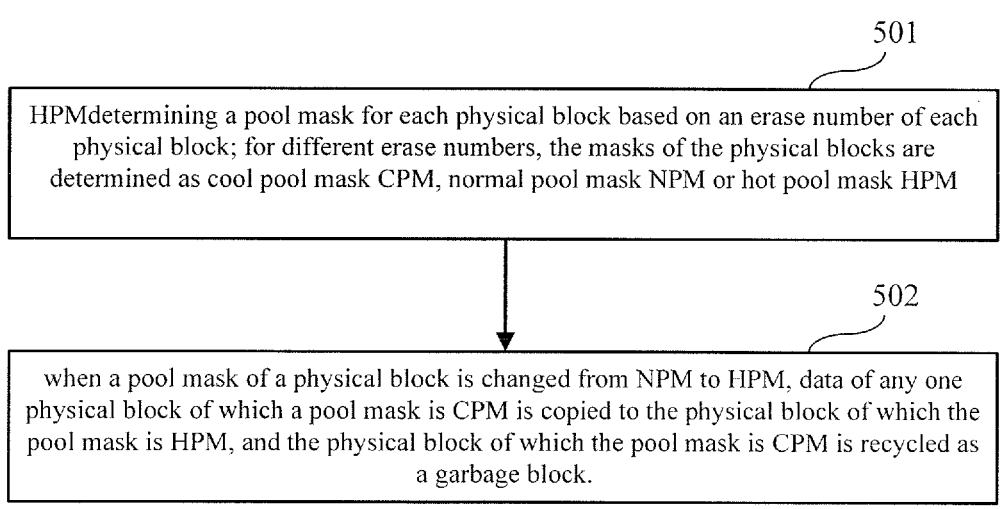
FIG. 5 is a general idea flow chart of the wear leveling method of one embodiment of the present invention.

Specifically, the overall implementation process of the present invention is shown in FIG. 5, and includes the following steps:

Step 501: determining a pool mask for each physical block based on an erase number of each physical block; for different erase numbers, the masks of the physical blocks can be determined as cool pool mask CPM, normal pool mask NPM or hot pool mask HPM.

In the wear leveling method of the present invention, for each physical block (hereinafter referred to as block) which the wear leveling is required to be performed on, three kinds of block properties including cool pool, normal pool and hot pool can be set, and can be identified and distinguished using pool masks. The pool masks can use two binary code forms. For example, 00 represents that this block belongs to the cool pool, 01 represents that this block belongs to the normal pool, and 11 represents that this block belongs to the hot pool. Further, each block records its erase number, determines a reference erase number RECC (the value of the RECC is equal to an erase number of one block which has the smallest erase number among all the blocks) and a pre-set threshold (TH) which represents the space between the cool pool and the hot pool and is used to determine one physical block should correspond to which of the pool masks. TH is an integer greater than 1, one block which has an erase number equal to RECC is cool pool mask, one block which has an erase number greater than or equal to RECC plus TH is hot pool mask, and one block of which an erase number is other values is normal pool mask. The pool mask can be altered in real time according to the changes of the erase number of the physical block. The specific alteration method can be: after the erase number is altered, a difference comparison is made between the altered erase number and the RECC, if the result is 1, then the current pool mask is changed to be normal pool mask NPM; if the result is TH, then the current pool mask is changed to be hot pool mask HPM; if for other results, the current pool mask remain unchanged.

Step 502: when a pool mask of a physical block is changed from NPM to HPM, data of any one physical block of which a pool mask is CPM is copied to the physical block of which the pool mask is HPM, and the physical block of which the pool mask is CPM is recycled as a garbage block.

This step is the static leveling part of the wear leveling of the present invention. When an erase number of one normal pool block achieves the standard to enter into the hot pool, i.e., the erase number is greater than or equal to RECC plus TH (for example, when a normal pool block of which data is erased through the garbage recycling process becomes a hot pool block), one block is selected from the cool pool and data of this cool pool block is moved to the block which enters into the hot pool, and the cool pool block is recycled (the garbage recycling process can adopt the existing garbage recycling methods, and can also adopt the improved method of the present invention which will be described in details later). Through this process, the cool pool block can be released from the cool pool so that data can be rewritten into the cool pool block to accelerate wear of the cool pool block, thereby achieving better wear leveling effect. Meanwhile, this static leveling process produces only one additional wear, i.e., one additional wear is produced when the block selected from the cool pool is erased. The block entering to the hot pool is a block of the normal garbage recycling process, and its data erase is not additionally caused by this method. Thus, when compared to the Dual-Pool algorithm, one additional wear is reduced in the method of the present invention.

Further, the present invention can also make an improvement to the dynamic leveling part of the existing technology. A blank block chained list EBL used to manage blank blocks and a garbage block chained list GBL used to manage garbage blocks can be built. The blank block queue in the process of allocating write block to the write operation can be controlled through the EBL. The garbage block queue in the process of recycling garbage can be controlled by the GBL. Elements (blank block in EBL, garbage block in GBL) in the chained lists of EBL and GBL are arranged according to an ascending order of erase numbers (block having smaller erase number is arranged in front, conversely in back; for the blocks having the same erase number, the first coming one can be arranged in front, or can also be arranged at random), to ensure recycling in priority the garbage blocks having small erase number in priority and to allocate in priority the blank blocks having small erase numbers as write blocks to the written request, thereby achieving good wear leveling effect. Moreover, EBL and GBL can exclude the hot pool blocks and there is no hot pool block entering into EBL and GBL, so that it can be maintained that the hot pool blocks do not continue to be erased, thereby further improving the wear leveling effect and reducing the scope of the physical blocks needed to be searched so as to improve the search speed.

Some specific examples will be given below to illustrate the wear leveling algorithm of the present invention. In the following text, improvements made to both of the dynamic part and the static part of the existing technology are taken as examples.

Figure 1:
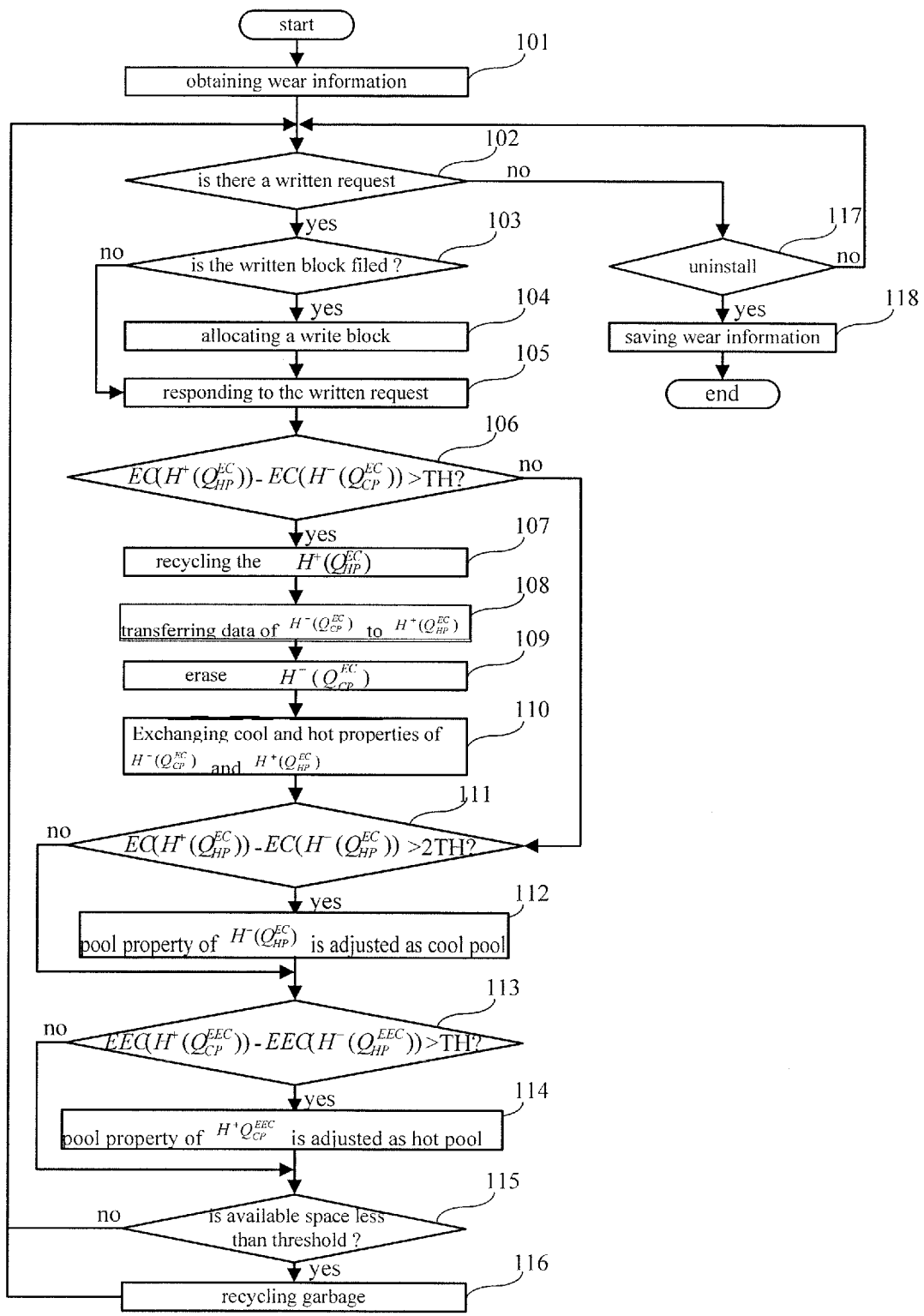
FIG. 1 is a flow chart of an existing wear leveling method.
Figure 2:
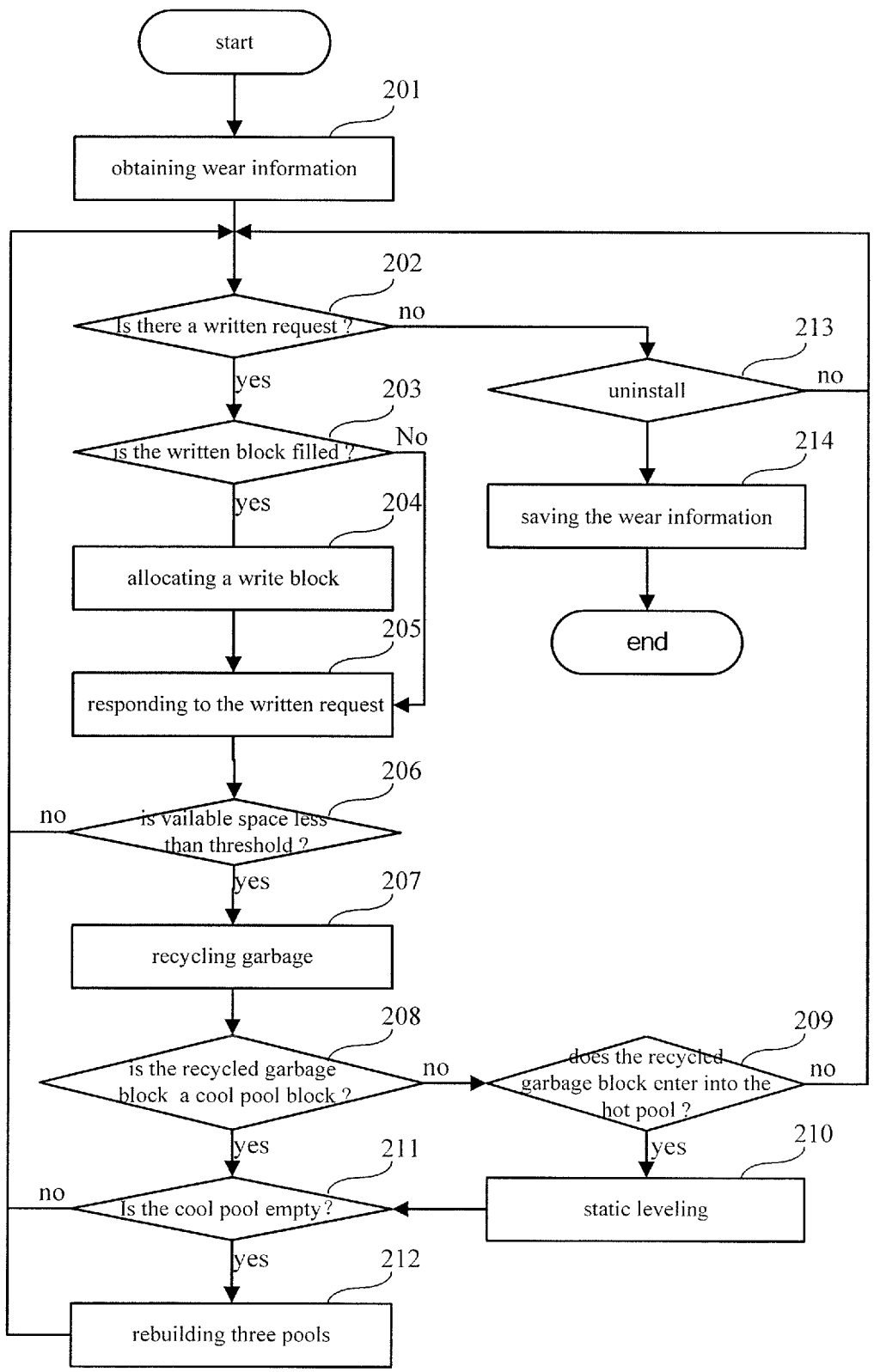
FIG. 2 is an overall flow chart of a wear leveling method of one embodiment of the present invention.

FIG. 2 is an overall flow chart of a wear leveling method of one embodiment of the present invention. As shown in FIG. 2, the method includes the following steps:

Step 201: obtaining wear information; the wear information means information which is need to perform wear leveling, and includes an erase number of each physical block, pool mask of each physical block, EBL and GBL. If the memory is non-first used, the current values of the wear information can be directly read from the backup area of the memory. If the memory is first used, it is needed to build wear information first, for example, setting the erase numbers of all the blocks to be 0, marking cold and hot pool masks for all the physical blocks, building EEBL and GBL and so on. The method of determining the pool masks has been already described above in details, and is not repeated here. When the memory is first used, the erase number of all the blocks is 0, so RECC is also 0, i.e., all the blocks will be determined as cool pool mask CPM when being first used Regarding to whether the memory is first used, it can be determined by viewing whether there is backed up data in the backup area: if there is no backed up data, it illustrate that the memory is first used, otherwise, the memory is not first used.

Moreover, it should be noted that, if the memory is first used, the initialization process of the memory also includes searching and processing bad block, i.e., finding all the initial bad blocks. When finding the bad blocks, the state of each block can be detected; if there are data, because of first used, these data are not invalid to the user, then when building GBL and EBL, this block can be put in GBL waiting for being erased; If there is no data, this block can be put in EBL for standby application. Since the bad blocks cannot be used, thus the bad blocks do not belong to the scope of the physical block described in the present invention.

If the memory is not first used and was not normally uninstalled, then when obtaining wear information, the obtained GBL and EBL may be incorrect and it is needed to correct GBL and EBL. Specifically, the wear information which is backed up during a normal uninstall process of the memory can be loaded from the backup area, then the storage conditions of each block in EBL is inspected from the beginning of the chained list. If one block is non-empty, it indicates that this block has been allocated out before the last uninstall, and this block should be deleted from the EBL. This inspection process continues until encountering the first blank block or until EBL is empty. Similarly, it is needed to inspect the conditions of GBL, the storage conditions of each block in GBL is inspected from the beginning of the chained list GBL. If one block is a blank block, it indicates that this block has been recycled before the last uninstall, and this block should be deleted from GBL and be put in EBL. This inspection process continues until encountering the first non-blank block or until GBL is empty.

Step 202: determining whether there is a written request, if yes, proceeding to step 203, otherwise proceeding to step 213;

Step 203: determining whether written block has been filled, if yes, proceeding to step 204, otherwise proceeding to step 205;

Step 204: allocating the first element in EBL chained list to be a write block;

Step 205: responding to the written request;

Step 206: determining whether available space of the memory is less than pre-set threshold, if yes, proceeding to step 207, otherwise returning back to step 202;

Step 207: recycling garbage, of which the detailed process will be described later;

Step 208: determining whether the recycled garbage block is a cool pool block before being recycled; if yes, proceeding to step 211, otherwise returning back to step 209;

Step 209: determining whether the recycled garbage block is changed to a hot pool block after being recycled (when the garbage block is recycled, the original data will be erased and the erase number will be increased by 1; if the erase number after increased by 1 reaches RECC plus TH, then the block will be changed to a hot pool block after being recycled); if yes, proceeding to step 210, otherwise returning back to step 202;

Step 210: static leveling, proceeding to step 211;

Step 211: determining whether the cool pool is empty, if yes, proceeding to step 212, otherwise returning back to step 202;

Step 212: rebuilding three pools, and returning back to step 202. if the cool pool is empty, the wear leveling algorithm of the present invention cannot continue, thus, it is needed to redefine a new RECC according to an erase number of one block having the smallest erase number among all the current blocks, then pool masks of the physical blocks an be redefined according to the new RECC, thereby maintaining the structure of three pools.

Step 213: determining whether the memory is uninstalled, if yes, proceeding to step 214, otherwise returning back to step 202;

Step 214: saving the wear information, and ending the process.

Steps 202~207 are the dynamic wear leveling parts of the present invention, and steps 202, 203, 205 and 206 are the same as the existing technology and are not repeated here. In step 204, the way to allocate the write block from EBL is to allocate in sequence starting from the first element in EBL head, thus, it can be ensured that the block having small erase number can be allocated in priority to write request. Step 207 is a key of the dynamic leveling part of the present invention, which improves the existing garbage recycling process, so that the present invention can also produce wear leveling effect in the garbage recycling process, making the present invention much better than the existing technology in the wear leveling effect. The detailed process of recycling garbage will be described later.

Steps 208~210 are static leveling parts. Steps 208 and 209 are used to determine whether it is needed to perform static leveling. In fact, the static leveling of the present invention is triggered when the pool mask of one physical block with the normal pool mask is changed to hot pool mask. Steps 208 and 209 are respectively used to determine a pool mask of the physical block with a changed pool mask before and after the changes, and the sequence of these two steps are interchangeable and does not affect the final determined result. The specific flow of the static leveling of step 210 will be described in the following.

Steps 213 and 214 are similar to the existing normal uninstall process, and are not repeated here, and the difference is only that when there is wear information, the stored information includes EL, GBL, erase numbers of all the blocks and SLWM. Further, each block will also save the erase number of the block in a redundancy district in a physical page of the block.

The garbage recycling process of the dynamic leveling part will be specifically described in the following.

Figure 3:
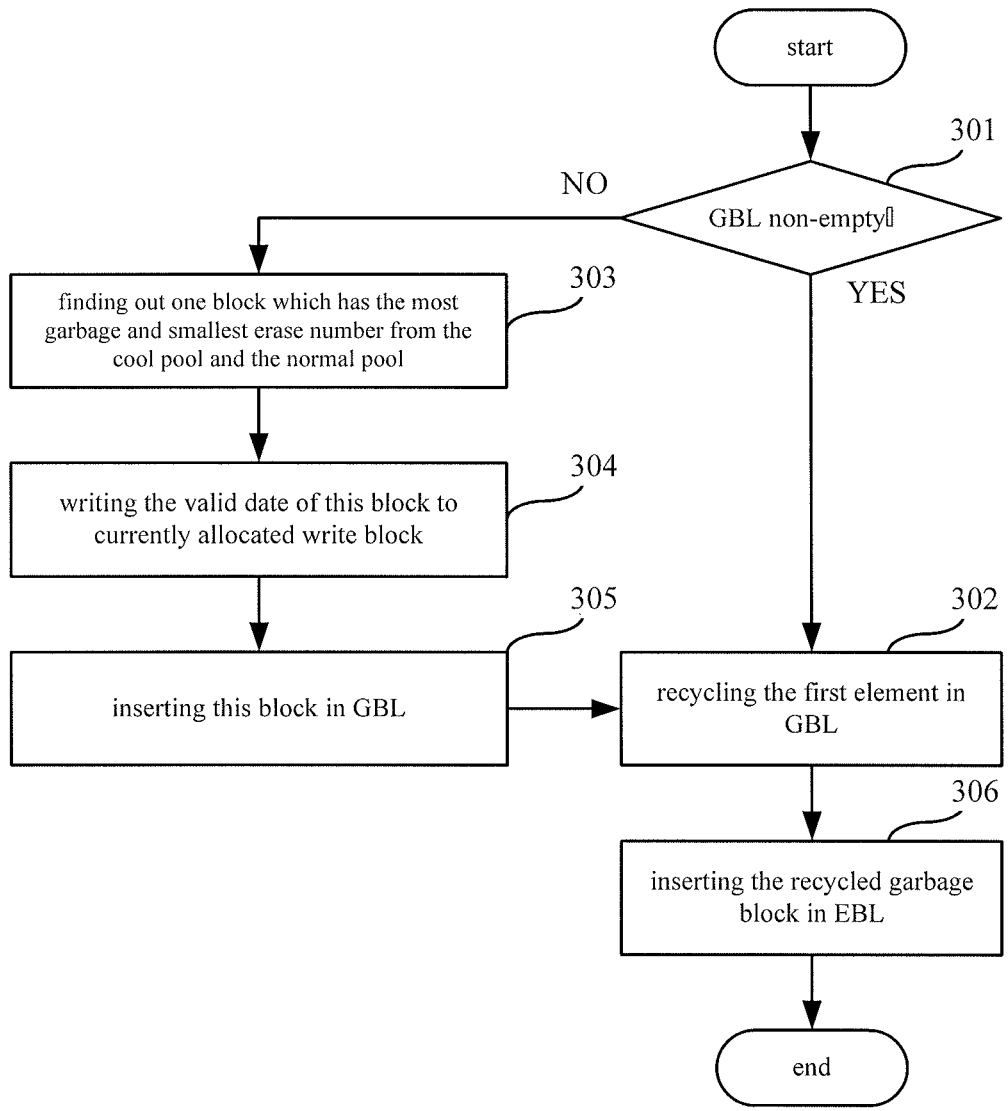
FIG. 3 is a flow chart of a garbage recycling method of one embodiment of the present invention.

In fact, the garbage recycling process includes two parts, i.e., normal garbage recycling and compulsive garbage recycling. The normal garbage recycling means a garbage recycling process when detecting there is garbage produced (if one data is updated, its old version is marked as garbage; if all the data of one block are marked as garbage, this block is a garbage block). The normal garbage recycling process in the existing technology is to directly erase the data of the garbage block and to add the block at the end of the blank block queue; while in the present invention, it is not to immediately erase the data of the garbage block but to inset the garbage block in GBL for standby application. Only when the number of the blank block in EBL is less than the pre-set threshold, one garbage block is selected from GBL and is inserted in EBL after data thereof being erased. In EBL, elements are arranged according to an ascending order of erase numbers, and the first element is always allocated in the allocation of write block. The arrangement and allocation method of the garbage blocks in GBL are the same as that of EBL, thereby ensuring that the block having small erase number can be erased and used in priority. For the physical block which is marked as hot pool, even it becomes garbage block, it will not be recycled i.e., this garbage block is not inserted in GBL. In the normal garbage recycling, the operation of detecting the garbage blocks can be repeated at a certain time interval, and can also be executed fixed after some action, for example can be executed after completeness of the responding to the written request of step 205. The compulsive garbage recycling (such as step 207) is performed only when the available space of the memory is less than pre-set threshold (not the threshold TH). The specific flow is shown in FIG. 3, and includes the following steps:

Step 301: determining whether GBL is non-empty, if yes, proceeding to step 302, otherwise proceeding to step 303;

Step 302: recycling the first element in GBL, and proceeding to step 306;

Step 303: finding out one block which has the most garbage and smallest erase number from the cool pool and the normal pool;

Step 304: writing the valid date of this block to currently allocated write block;

Step 305: inserting this block in GBL, and returning to step 302;

Step 306: inserting the recycled garbage block in EBL, and ending the process.

Figure 4:
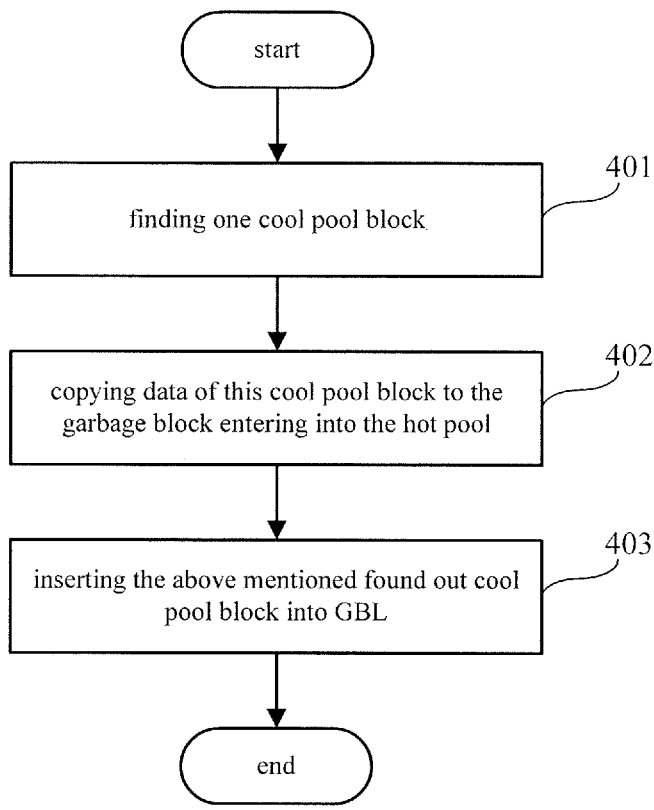
FIG. 4 is a flow chart of a static leveling part of the wear leveling method of one embodiment of the present invention.

As the above mentioned dynamic leveling progressed, some blocks leave from the cool pool. Some blocks stay in the cool pool because the written data thereof is cool data (such as system files) which is not updated for a long time. For those blocks which stay in the cool pool for long time, the static leveling process of the present invention can be used to accelerate wear of those blocks which stay in the cool pool for long time, thereby improving wear leveling effect. The specific method is shown in FIG. 4 and includes the following steps:

Step 401: finding one cool pool block which can be any one cool block via random search, and can also be a cool pool block found out according to certain rules, such as finding out one block in which the last modification time of the data stored is earliest;

Step 402: copying data of this cool pool block to the garbage block entering into the hot pool;

Step 403: inserting the above mentioned found out cool pool block into GBL chained list; the above mentioned found out cool pool block can be inserted into the first position of GBL, or can be inserted according to arrangement rules of GBL.

The embodiment of the wear leveling method of the present invention described above is only one preferred embodiment. If only implementing the above mentioned static part, then it is not needed to build EBL and GBL, and it is also not needed to perform the operations related to EBL and GBL, and the existing blank block queue and garbage recycling process can be stilled used. But if implementing the above mentioned dynamic part and static part at the same time, better wear-leveling effect can be obtained besides accelerating the physical block search speed during the implementation of the algorithm. Through experiments, when the present invention implements the above mentioned static part and dynamic part at the same time, the present invention can strict control the uneven level of the wear within $TH^2/4$ (i.e., the value of the square of the pre-set thresholds TH divided by 4), and can effectively extend the life of non-volatile memory.

Further, in the above mentioned embodiments, the pre-set thresholds TH is a fixed value; the greater the TH, the greater the range of the normal pool, the smaller the range of the hot pool, then less physical blocks frozen by the hot pool, the slower the speed at which the physical blocks in the normal pool enter into the hot pool; the smaller the TH, the smaller the range of the normal pool, the greater the range of the hot pool, the greater the physical blocks frozen by the hot pool, the faster the speed at which the physical blocks in the normal pool enter into the hot pool.

The greater the physical blocks in the hot pools, the overall wear of the physical blocks will also be more evenly. But since the speed of the physical blocks in the normal pool entering in the hot pool is fast, and the garbage recycling process will be triggered when there are physical blocks in the normal pool entering in the hot pool, and the garbage recycling process will produce additional wear, that is to say, the less the TH, the better the wear balance degree, but this will trigger more garbage recycling process to produce more additional wear; the greater TH, the contrary is the case. It can be seen, if it is desired to obtain better wear leveling degree, then the value of TH can be set to be smaller; if considering reducing additional wear, then the value of TH can be set to be greater.

It can be seen from the above mentioned analysis of the impact of the value of TH on the wear leveling effect, it is needed to establish a balance between the wear leveling degree and the additional wear based on how much the value of TH is specifically set. For the fixed TH, it cannot make the two unify, when one aspect is improved, at the same time, another aspect will lose some.

Then, as another embodiment, if TH is a variable threshold value, during the utilization process of the non-volatile memory, TH can be changed with the wear condition of the physical blocks, so that TH can be better adapted to the requirements for balanced degree and additional wear under different wear conditions.

For example, in normal situations, in the initial use stage of the non-volatile memory, since the erase numbers of the physical blocks are all small, at that time, the overall service life of the memory has a high tolerance for the wear non-leveling, i.e., the requirement for the wear leveling degree is not high; and the additional wear is a factor which needs comparatively more consideration. With the utilization the non-volatile memory, the erase numbers of the physical blocks are increased. There will be more and more situations that erase number of one physical block far exceeds that of other physical blocks. At this time, the overall service life of the memory will have more higher requirement for the wear leveling degree, and the additional wear will be comparatively not so sensitive Thus, the initial value of TH can be a large value and is continuously reduced with the utilization the non-volatile memory, and can obtain better wear leveling effect when compared to the fixed TH. One specific example is given below.

TH is made to reduce with increasing RECC; RECC is continuously increased with the utilization the non-volatile memory, thus, can reflect the utilization situations of the memory, and can also reflect wear conditions of the physical blocks; therefore, TH can be made to change according to the situations of RECC. Specifically, when the RECC is changed, a pre-set variable can be subtracted from TH until TH reaches the pre-set minimum value or reaches the minimum value i.e., 2 of the numeric range of TH.

TH can also reduce with increasing average erase number of all the physical blocks; similarly, the average erase number of all the physical blocks in the memory are also increased with the utilization the non-volatile memory, and can also reflect the utilization situations of the memory, thus, TH can be made to change according to the average erase number of all the physical blocks. Specifically, when the average erase number of all the physical blocks is increased with a pre-set added value, a pre-set variable can be subtracted from the value of TH until TH reaches the pre-set minimum value or reaches the minimum value of the numeric range of TH. The pre-set added value can be a fixed value, such as 100, or be 1% of the maximal erase number of the physical blocks, and can also be a variable value which is determined according to the average erase number of all the physical blocks, for example, the added value can also change with increasing average erase number of all the physical blocks.

Further, the change of TH is not always linear, and not always monotonic. The value of TH can be smartly and wisely altered through detecting the specific wear conditions of all the physical blocks in the memory. For example, if it is detected that the wear condition of the current physical block is relatively even, then the value of TH can be increased to further reduce additional wear; contrarily, the value of TH can be reduced to improve the balanced degree of wear at the sacrifice of additional wear. The specific strategy of changes of the value of TH can be determined according to specific requirements.

Of course, any other parameters which can reflect wear conditions of the physical blocks in the memory can be used as a basis of the changes of TH, for example, the changes of TH can be based on erase number of one physical block which has the largest erase number among all the physical blocks, service time of the memory, or synthetically determined based on various parameters and son on. It is impossible here to give examples one by one; however, it is a core of this embodiment to make TH change with the wear conditions of the physical blocks. On the basis of the Dual-Pool wear leveling algorithms, the variable threshold value mode is further adopted, to further achieve the control for the scope of physical blocks frozen in the hot pool and the speed of the physical blocks from cool pool to the normal pool and from normal pool to the hot pool in the transferring process, thereby obtaining netter wear leveling effect.

What is more important, in the embodiment which includes variable threshold value of the present invention, the negative effect generated in the process of changing of the threshold value is minor compared to the existing wear leveling algorithms including variable threshold value solution. For example, if a variable threshold value is introduced in the existing Dual-Pool algorithm, data exchanging process between the physical blocks in the cool pool and the physical blocks in the hot pool will be increased at the time that the threshold value is reduced, thereby greatly increasing the additional wear; further, the increased threshold value will result in that wear leveling degree cannot be ensured; for the final purpose of improving the lifetime of the memory, the maximal value of the lifetime of the memory is usually correspondingly tended towards an optimal threshold value; it is usually not worth the candle to alter the threshold value in the utilization process of the non-volatile memory, instead the lifetime of the memory may be reduced. Thus, the consummate researches of the existing wear leveling algorithm all focus on determining the optimal threshold value, and the variable threshold value solution has been gradually discarded. Based on the three pool algorithm of the present invention, the variable threshold value solution is introduced, since the additional wear produced by the algorithm itself is little, thus changing the threshold value will not produce too many additional wear, and the positive impact on the lifetime of the memory exceeds the negative impact, so that the variable threshold value solution is really practical.

Figure 6:
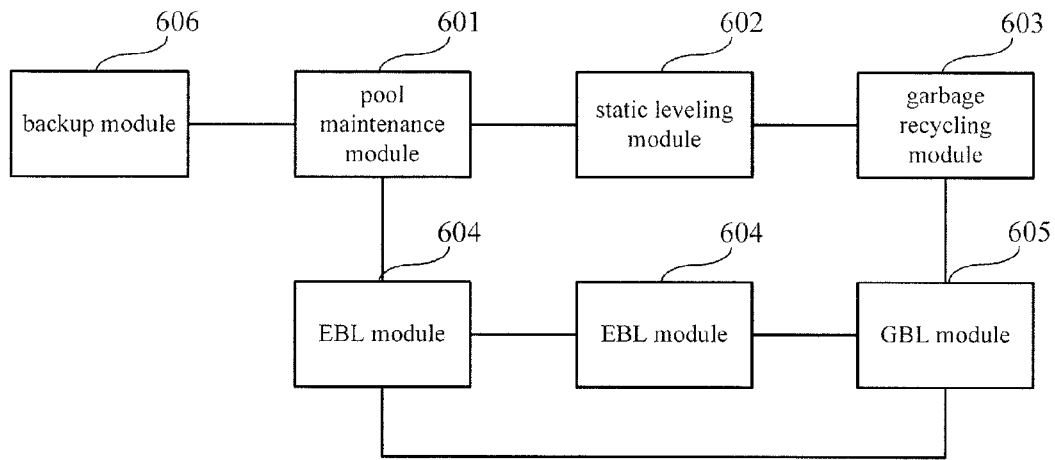
FIG. 6 is a schematic structural view of a wear leveling apparatus of one embodiment of the present invention.

Further, the present invention also provides a wear leveling apparatus, as shown in FIG. 6, the apparatus includes:

a pool maintenance module 601 used to determine a pool mask for each physical block based on the erase number of each physical block; for different erase numbers, the masks of the physical blocks can be cool pool mask CPM, normal pool mask NPM or hot pool mask HPM;

a static leveling module 602 connected to the pool maintenance module 601; when a pool mask of a physical block is changed from NPM to HPM, the static leveling module 602 is used to copy data of any one physical block of which a pool mask is CPM to the physical block of which the pool mask is HPM;

a garbage recycling module 603 connected to the static leveling module 602 and used to recycle the physical block of which the pool mask is CPM as a garbage block.

Figure 7:
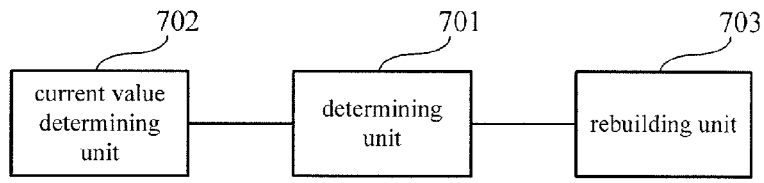
FIG. 7 is a schematic structural view of a pool maintenance module of one embodiment of the present invention.

The pool maintenance module is shown in FIG. 7 and includes:

a determining unit 701 used to determine a pool mask of a physical block as cool pool mask when an erase number of the physical block is equal to RECC; the determining unit 701 used to determine a pool mask of a physical block as hot pool mask when an erase number of the physical block is greater than or equal to RECC plus TH; the determining unit 701 used to determine a pool mask of a physical block as normal pool mask when an erase number of the physical block is other value;

RECC is reference erase number counter, the value of the RECC is equal to an erase number of one block which has the smallest erase number among all the blocks; TH is a pre-set threshold, and is an integer greater than 1, and represents the space between the cool pool and the hot pool;

Preferably, the apparatus can further include:

an EBL module 604 to maintain the blank block chained list EBL which is used to manage the blank blocks, and to arrange the blank blocks in EBL according to an ascending order of erase numbers; when it is needed to allocate a blank block to the written request, EBL module 604 used to allocate the first blank block in EBL as a write block to write the request.

Moreover, the EBL module 604 can further prevent the blank blocks of which the pool mask is HPM from entering, thereby protecting the hot pool blocks from further wear.

Preferably, the apparatus can further include:

GBL module 605 which is connected to the garbage recycling module 603 and the EBL module 604, respectively; the GBL module 605 used to maintain the garbage block chained list GBL which is used to manage the garbage blocks, and used to arrange the garbage blocks in the GBL according to an ascending order of erase numbers;

Moreover, the GBL module 605 can further prevent the garbage blocks of which the pool mask is HPM from entering, thereby protecting the hot pool blocks from further wear.

The GBL module 605 can further be used to determine whether GBL is non-empty when the number of the blank blocks in EBL maintained by the EBL module 604 is less than the pre-set threshold;

If GBL is non-empty, data of the first garbage block in GBL is erased so that the first garbage block in GBL becomes a blank block which is inserted in EBL maintained by the EBL module 604;

If GBL is empty, the valid data of one physical block which has the most garbage data and smallest erase number among the physical blocks of which the pool mask is cool pool mask and normal pool mask, is first written to the currently allocated write block, and the physical block which has the most garbage data and smallest erase number is inserted in GBL, then data of the first garbage block in GBL is erased so that the first garbage block in GBL becomes a blank block and is inserted in EBL.

The garbage recycling module 603 is specifically used to insert the garbage blocks of which the masks are cool pool masks and normal pool mask in GBL maintained by the GBL module.

Preferably, the pool maintenance module 601 can further include:

a current value determining unit 702 connected to the determining unit 701; the current value determining unit 702 used to set current erase numbers of all the physical blocks to be 0 and current pool masks of all the physical blocks to be cool pool mask when the memory is first used;

or, the pool maintenance module 601 can further include:

a current value determining unit 702 connected to the determining unit 701; the current value determining unit 702 used to read and obtain current erase numbers, pool masks, EBL and GBL of all the physical blocks from the backup area of the memory when the memory is non-first used and the memory was normally uninstalled;

or, the pool maintenance module 601 can further include:

a current value determining unit 702 connected to the determining unit 701; the current value determining unit 702 used to load current erase numbers, pool masks, EBL and GBL of all the physical blocks which are backed up during a normal uninstall process of the memory from the backup area of the memory, when the memory is not first used and was not normally uninstalled;

The EBL module 604 inspects the storage conditions of the physical blocks in EBL one by one starting from the first physical block in EBL; if one physical block is not blank block, then this physical block is deleted from EBL; the inspection continues until detecting that one physical block is blank block or until EBL is empty;

The GBL module 605 inspects the storage conditions of the physical blocks in GBL one by one starting from the first physical block in GBL; if one physical block is a blank block, then this physical block is deleted from GBL and is inserted EBL maintained by the EBL module 604; the inspection continues until detecting that one physical block is garbage block or until GBL is empty.

Preferably, the pool maintenance module 601 can further include:

a rebuilding unit 703 connected to the determining unit 701; when the pool masks of all the physical blocks are not cool pool masks, the value of RECC is corrected according to an erase number of one block having the smallest erase number among all the current blocks, then pool masks of all the physical blocks are redefined according to the corrected RECC, Further, the apparatus can also further include:

a backup module 606 which is connected to the pool maintenance module 601, the EBL module 604, the GBL module 605, respectively; the backup module 606 used to save the current erase numbers, masks, the current EBL and GBL of all the physical blocks to the backup area of the memory when the memory is normally uninstalled.

Preferably, the backup module 606 can further be used to save in real time the erase number of each physical block in a physical page of the physical block.

Finally, corresponding to the embodiment in which TH is a variable threshold of the embodiment of the method, the apparatus can further include:

a variable threshold module 606 connected to the pool maintenance module 601 and used to make TH change with the wear condition of the physical block.

Figure 8:
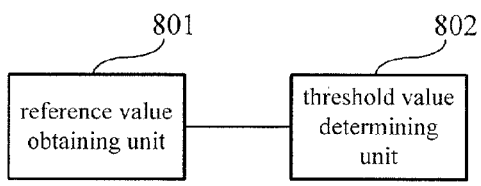
FIG. 8 is a schematic structural view of a variable threshold module of one embodiment of the present invention.

Specifically, the detailed structure of the variable threshold module 606 is shown in FIG. 8 and includes:

a reference value obtaining unit 801 used to obtain the value of RECC;

a threshold value determining unit 802 connected to the reference value obtaining unit 801 and used to make TH reduce with increasing RECC; specifically, when RECC is changed, the threshold value determining unit 802 subtracts a pre-set variable from the value of TH until TH reaches the pre-set minimum value.

Figure 9:
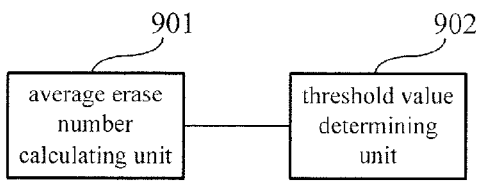
FIG. 9 is a schematic structural view of a variable threshold module of another embodiment of the present invention.

As another embodiment, the detailed structure of the variable threshold module 606 is shown in FIG. 9 and includes:

an average erase number calculating unit 901 used to calculate an average erase number of all the physical blocks;

a threshold value determining unit 902 connected to the average erase number calculating unit 901 and used to make TH reduce with increasing average erase number of all the physical blocks according to the average erase number of the physical blocks calculated by the average erase number calculating unit 901; specifically, when the average erase number of all the physical blocks is increased with a pre-set added value, the threshold value determining unit 902 subtracts a pre-set variable from the value of TH until TH reaches the pre-set minimum value.

Other implementation modes of the backup module 606 can refer to the embodiments of the method, and are not repeated here.

It can be seen from the above mentioned embodiments, the wear leveling method and apparatus of the present invention divides the physical blocks into three pools and makes improvements to the existing static leveling part, so that the wear leveling method of the invention produces one additional wear only when recycling the physical blocks having cool pool masks, the additional wear is reduced when compared to the existing technology. Further, through making TH which is used to divide the three pools variable with the wear conditions of the physical blocks, thus, better wear leveling effect can be obtained.

The invention claimed is:

1. A wear leveling method, comprising:
   determining a pool mask for each physical block based on an erase number of each physical block;
   wherein for different erase numbers, pool masks of the physical blocks are determined as cool pool mask CPM, normal pool mask NPM or hot pool mask HPM;
   when the pool mask of a physical block is changed from NPM to HPM, data of any physical block of which the pool mask is CPM is copied to the physical block of which the pool mask is HPM, and the physical block of which the pool mask is CPM is recycled as a garbage block;

wherein for different erase numbers, masks of the physical blocks are determined as cool pool mask CPM, normal pool mask NPM or hot pool mask HPM, including:
if one physical block which has the erase number equal to value of RECC, the pool mask of this physical block is determined as CPM; if one physical block which has the erase number greater than or equal to value of RECC plus TH, a pool mask of this physical block is determined as HPM; if one physical block of which the erase number is other value, a pool mask of this physical block is determined as NPM;
wherein the RECC is a reference erase number counter, and the value of the RECC is equal to an erase number of one block which has the smallest erase number among all the blocks;
wherein the TH is a pre-set threshold and is an integer greater than 1;
wherein the method further comprises:
establishing a garbage block chained list GBL which is used to manage garbage blocks, and the garbage blocks in the GBL being arranged according to an ascending order of erase numbers thereof;
wherein the GBL prevents one garbage block of which a pool mask is HPM from entering.

2. The wear leveling method of claim 1, wherein the TH changes with wear conditions of the physical blocks.

3. The wear leveling method of claim 2, wherein the TH changes with wear conditions of the physical blocks, comprises:
the TH reduces with increasing of the RECC.

4. The wear leveling method of claim 3, wherein the TH reduces with increasing of the RECC, comprises:
when the RECC is changed, a pre-set variable is subtracted from the TH until the TH reaches a pre-set minimum value.

5. The wear leveling method of claim 2, wherein the TH changes with wear conditions of the physical blocks, comprises:
the TH reduces with increasing of an average erase number of all the physical blocks.

6. The wear leveling method of claim 5, wherein the TH reduces with increasing of an average erase number of all the physical blocks, comprises:
when the average erase number of all the physical blocks is increased with a pre-set added value, a pre-set variable is subtracted from the TH until the TH reaches a pre-set minimum value.

7. The wear leveling method of claim 1, wherein the method further comprises:
establishing a blank block chained list EBL which is used to manage blank blocks, the blank blocks in the EBL being arranged according to an ascending order of erase numbers thereof;
when it is needed to allocate a blank block to a written request, the first blank block in the EBL is allocated as a write block to the written request.

8. The wear leveling method of claim 7, wherein the EBL prevents one blank block of which a pool mask is HPM from entering.

9. The wear leveling method of claim 7, wherein when the number of the blank blocks in the EBL is less than a pre-set threshold, a garbage recycling process described in the following is performed:
if the GBL is non-empty, data of a first garbage block in the GBL is erased so that the first garbage block in the GBL becomes a blank block which is then inserted in the EBL;
if the GBL is empty, valid data of one physical block which has the most garbage data and smallest erase number among all physical blocks of which pool masks are CPM and NPM, is written to the currently allocated write block, and the physical block which has the most garbage data and smallest erase number is inserted in the GBL, and data of the first garbage block in the GBL is erased so that the first garbage block in the GBL becomes a blank block and is then inserted in the EBL.

10. The wear leveling method of claim 7, wherein when the garbage recycling comprises:
garbage blocks of which masks are CPM and NPM are inserted in the GBL.

11. The wear leveling method of claim 1, wherein if a memory is first used, before performing the step of determining a pool mask for each physical block based on the erase number of each physical block, current erase numbers of all the physical blocks are set to be 0, and current pool masks of all the physical blocks are set to be CPM.

12. The wear leveling method of claim 7, wherein if a memory is non-first used and the memory was normally uninstalled, before performing the step of determining a pool mask for each physical block based on the erase number of each physical block, current erase numbers, pool masks, EBL and GBL of all the physical blocks are read and obtained from a backup area of the memory.

13. The wear leveling method of claim 7, wherein if a memory is not first used and was not normally uninstalled, before performing the step of determining a pool mask for each physical block based on the erase number of each physical block,
erase numbers, pool masks, EBL and GBL of all the physical blocks which are backed up during a normal uninstall process of the memory are loaded from the backup area of the memory;
storage conditions of the physical blocks in the EBL are inspected one by one starting from the first physical block in the EBL; if one physical block is not a blank block, then this physical block is deleted from the EBL; the inspection continues until detecting that one physical block is blank block or until the EBL is empty;
storage conditions of the physical blocks in the GBL are inspected one by one starting from the first physical block in the GBL; if one physical block is a blank block, then this physical block is deleted from the GBL and is inserted in the EBL; the inspection continues until detecting that one physical block is a garbage block or until the GBL is empty.

14. The wear leveling method of claim 1, wherein if pool masks of all the physical blocks are not CPM, the value of RECC is corrected according to the erase number of one physical block having the smallest erase number among all the current physical blocks, and pool masks of all the physical blocks are redefined according to the corrected RECC.

15. The wear leveling method of claim 7, wherein a method further comprises: when a memory is normally uninstalled, current erase numbers, masks, current EBL and GBL of all the physical blocks are saved to the backup area of the memory.

16. The wear leveling method of claim 15, wherein the erase number of each physical block is saved in real time in a physical page of the physical block.

17. A computer-implemented wear leveling apparatus, comprising one or more processors coupled to a memory storing instructions, for executing by the one or more processors, configured to:

determine a pool mask for each physical block based on an erase number of each physical block; wherein for different erase numbers, masks of the physical blocks are cool pool mask CPM, normal pool mask NPM or hot pool mask HPM;

when the pool mask of a physical block is changed from NPM to HPM, copy data of any physical block of which the pool mask is CPM to the physical block of which the pool mask is HPM; and recycle the physical block of which the pool mask is CPM as a garbage block;

wherein the one or more processors are further configured to:

determine a pool mask of a physical block as CPM when the erase number of the physical block is equal to value of RECC; determine a pool mask of a physical block as hot pool mask when the erase number of the physical block is greater than or equal to value of RECC plus TH; and determine a pool mask of a physical block as normal pool mask when the erase number of the physical block is other value; and wherein the RECC is a reference erase number counter, and the value of the RECC is equal to the erase number of one block which has the smallest erase number among all the blocks; the TH is a pre-set threshold and is an integer greater than 1;

maintain a garbage block chained list GBL which is used to manage the garbage blocks, the garbage blocks in the GBL being arranged according to an ascending order of erase numbers thereof, prevent one garbage block of which a pool mask is HPM from entering.

18. The computer-implemented wear leveling apparatus of claim 17, wherein the one or more processors are further configured to: make the TH change with wear conditions of the physical blocks.

19. The computer-implemented wear leveling apparatus of claim 18, wherein the one or more processors are further configured to:
obtain the value of the RECC; and
make the TH reduce with increasing of the RECC.

20. The computer-implemented wear leveling apparatus of claim 19, wherein the one or more processors are further configured to:
when the RECC is changed, subtract a pre-set variable from the value of the TH until the TH reaches a pre-set minimum value.

21. The computer-implemented wear leveling apparatus of claim 18, wherein the one or more processors are further configured to:
calculate an average erase number of all the physical blocks; and
make the TH reduce with increasing of the average erase number of all the physical blocks.

22. The computer-implemented wear leveling apparatus of claim 21, wherein the one or more processors are further configured to:
when the average erase number of all the physical blocks is increased with a pre-set added value, subtract a pre-set variable from the value of the TH until the TH reaches a pre-set minimum value.

23. The computer-implemented wear leveling apparatus of claim 17, wherein the one or more processors are further configured to:
maintain a blank block chained list EBL which is used to manage the blank blocks, the blank blocks in EBL being arranged according to an ascending order of erase numbers thereof; when it is needed to allocate a blank block to a written request, allocates the first blank block in the EBL as a write block to the written request.

24. The computer-implemented wear leveling apparatus of claim 23, wherein the one or more processors are further configured to:
prevent one blank block of which a pool mask is HPM from entering.

25. The computer-implemented wear leveling apparatus of claim 23, wherein when available space of the memory is less than a pre-set threshold, the one or more processors are further configured to:
if the GBL is non-empty, data of the first garbage block in the GBL is erased so that the first garbage block in the GBL becomes a blank block which is then inserted in the EBL;
if the GBL is empty, valid data of one physical block which has the most garbage data and smallest erase number among all physical blocks of which pool masks are CPM and NPM, is first written to the currently allocated write block, and the physical block which has the most garbage data and smallest erase number is inserted in the GBL, and then data of the first garbage block in the GBL is erased so that the first garbage block in the GBL becomes a blank block and is then inserted in the EBL.

26. The computer-implemented wear leveling apparatus of claim 23, wherein the one or more processors are further configured to: insert garbage blocks of which masks are CPM and NPM in the GBL.

27. The computer-implemented wear leveling apparatus of claim 17, wherein the one or more processors are further configured to:
set current erase numbers of all the physical blocks to be 0 and current pool masks of all the physical blocks to be cool pool mask when the memory is first used.

28. The computer-implemented wear leveling apparatus of claim 23, wherein the one or more processors are further configured to:
read and obtain current erase numbers, pool masks, EBL and GBL of all the physical blocks from the backup area of the memory when the memory is non-first used and the memory was normally uninstalled.

29. The computer-implemented wear leveling apparatus of claim 23, wherein the one or more processors are further configured to:
load current erase numbers, pool masks, EBL and GBL of all the physical blocks which are backed up during a normal uninstall process of the memory from the backup area of the memory, when the memory is not first used and was not normally uninstalled;
inspect storage conditions of the physical blocks in the EBL one by one starting from the first physical block in the EBL; if one physical block is not blank block, then this physical block is deleted from the EBL; the inspection continues until detecting that one physical block is blank block or until the EBL is empty;
inspect storage conditions of the physical blocks in the GBL one by one starting from the first physical block in the GBL; if one physical block is a blank block, then this physical block is deleted from the GBL and is inserted the EBL; the inspection continues until detecting that one physical block is garbage block or until the GBL is empty.

30. The computer-implemented wear leveling apparatus of claim 17, wherein the one or more processors are further configured to:
when pool masks of all the physical blocks are not CPM, the value of RECC is corrected according to the erase number of one block having the smallest erase number among all the current blocks, then pool masks of all the physical blocks are redefined according to the corrected RECC.

31. The computer-implemented wear leveling apparatus of claim 23, wherein the one or more processors are further configured to:
   save current erase numbers, masks, current EBL and GBL of all the physical blocks to the backup area of the memory when the memory is normally uninstalled.

32. The computer-implemented wear leveling apparatus of claim 31, wherein the one or more processors are further configured to: save in real time the erase number of each physical block in a physical page of the physical block.

* * * * *